United States Patent
Baccouche et al.

(10) Patent No.: US 9,296,293 B1
(45) Date of Patent: Mar. 29, 2016

(54) VEHICLE LOAD MANAGEMENT STRUCTURE

(71) Applicant: FORD GLOBAL TECHNOLOGIES, LLC, Dearborn, MI (US)

(72) Inventors: Mohamed Ridha Baccouche, Ann Arbor, MI (US); Rahul Arora, Royal Oak, MI (US); Horst Heribert Lanzerath, Bad Muenstereifel (DE); Carsten Tragsdorf, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 14/547,834

(22) Filed: Nov. 19, 2014

(51) Int. Cl.
*B62D 21/16* (2006.01)
*B60K 15/07* (2006.01)
*B62D 25/20* (2006.01)
*B60K 15/063* (2006.01)

(52) U.S. Cl.
CPC ............... *B60K 15/07* (2013.01); *B62D 25/20* (2013.01); *B60K 2015/0638* (2013.01)

(58) Field of Classification Search
CPC . B60K 15/07; B60K 2015/0638; B62D 25/20
See application file for complete search history.

(56) References Cited

U.S. PATENT DOCUMENTS

| | | | |
|---|---|---|---|
| 6,431,641 B2 | 8/2002 | Miyasaka | |
| 8,534,748 B1* | 9/2013 | Aghssa | B62D 25/087 280/794 |
| 2007/0257519 A1* | 11/2007 | Hanson, Jr. | B62D 21/157 296/204 |
| 2008/0258498 A1 | 10/2008 | Philip et al. | |
| 2011/0095573 A1* | 4/2011 | Teichmann | B62D 21/11 296/193.07 |
| 2011/0278881 A1* | 11/2011 | Asai | B60K 13/04 296/193.07 |
| 2012/0256446 A1* | 10/2012 | Yasuhara | B62D 21/11 296/193.07 |
| 2012/0274100 A1* | 11/2012 | Mildner | B62D 25/2036 296/193.07 |
| 2012/0306238 A1* | 12/2012 | Midoun | B60R 11/00 296/204 |
| 2014/0191498 A1 | 7/2014 | Shipp | |

FOREIGN PATENT DOCUMENTS

| | | |
|---|---|---|
| CN | 102076530 A | 5/2011 |
| DE | 102009039973 A1 | 3/2011 |
| EP | 0982160 A1 | 3/2000 |
| EP | 1415896 B1 | 6/2006 |
| WO | 0063061 A1 | 10/2000 |
| WO | 2013094133 A1 | 6/2013 |

* cited by examiner

*Primary Examiner* — Lori L Lyjak
(74) *Attorney, Agent, or Firm* — Jason Rogers; Brooks Kushman P.C.

(57) ABSTRACT

A vehicle structure includes a first member extending obliquely beneath an outer surface of an underbody component, and a second member extending at an acute angle to the first member. The second member is arranged to form an apex near an end of the first member. The vehicle structure also includes an interconnecting member connected to both the first and second members at locations offset from the apex. The first member, the second member, and the interconnecting member cooperate to enclose a portion of the underbody component.

16 Claims, 3 Drawing Sheets

9,296,293 B1

VEHICLE LOAD MANAGEMENT STRUCTURE

TECHNICAL FIELD

The present disclosure relates to vehicle body structures.

BACKGROUND

An emergency response vehicle may be placed under enhanced loads in comparison to standard vehicles. Energy associated with the loads may be absorbed by managing structural deflection. The amount of space available for deflection of the structure may influence required stiffness values for relevant vehicle load bearing structures. In vehicle environments having components in an efficient package space, clearance between components is minimized. Emergency response vehicles may benefit from structural countermeasures to manage non-standard loads.

SUMMARY

In at least one embodiment, a vehicle structure includes a first member extending obliquely beneath an outer surface of an underbody component, and a second member extending at an acute angle to the first member. The second member is arranged to form an apex near an end of the first member. The vehicle structure also includes an interconnecting member connected to both the first and second members at locations offset from the apex. The first member, the second member, and the interconnecting member cooperate to enclose a portion of the underbody component.

In at least one embodiment, a vehicle structure includes a pair of opposing longitudinal rails extending forward from a rear bumper beam. A first cross-member connectedly spans across the rails forward of the bumper beam. Similarly, a second cross-member connectedly spans across the rails forward of the first cross-member. The vehicle structure also includes a fuel tank disposed between the rails, and between the first and second cross-members. The vehicle structure further includes an elongate first member connectedly extending from the first cross-member to the second cross-member at an oblique angle, and an elongate second member connectedly extending from the first cross-member at an acute angle relative to the first elongate member. The elongate second member is arranged to form an apex proximate to the first cross-member. The vehicle structure further includes at least one interconnecting member joining the first elongate member to the second elongate member. Collectively the elongate first and second members enclose a lower portion of the vehicle fuel tank.

In at least one embodiment, a vehicle load management system includes an underbody frame having a pair of longitudinal rails connected by laterally extending cross-members. The vehicle load management system also includes a fuel tank disposed between the pair of longitudinal rails and between two adjacent laterally extending cross-members. A pair of truss structures connectedly spans the underbody frame beneath a portion of the fuel tank to carry load.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
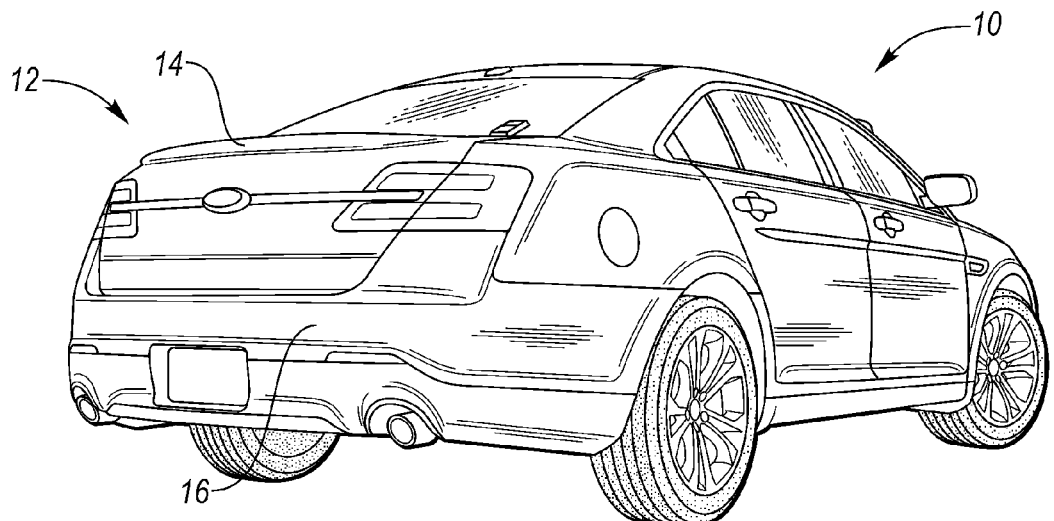
FIG. 1 is a rear perspective view of a vehicle body.

Referring to FIG. 1, a rear portion 12 of a vehicle 10 is depicted. A rear bumper surface 14 covers an underlying structure, such as a bumper beam for example. A fuel tank, a spare tire, as well as various other components may be disposed at a lower rear portion forward of the rear bumper. A trunk storage compartment 16 near the rear portion 12 provides storage for equipment and various other cargo. In at least one embodiment, a passenger compartment is located forward of the trunk storage compartment 16 and above the fuel tank.

Figure 2:
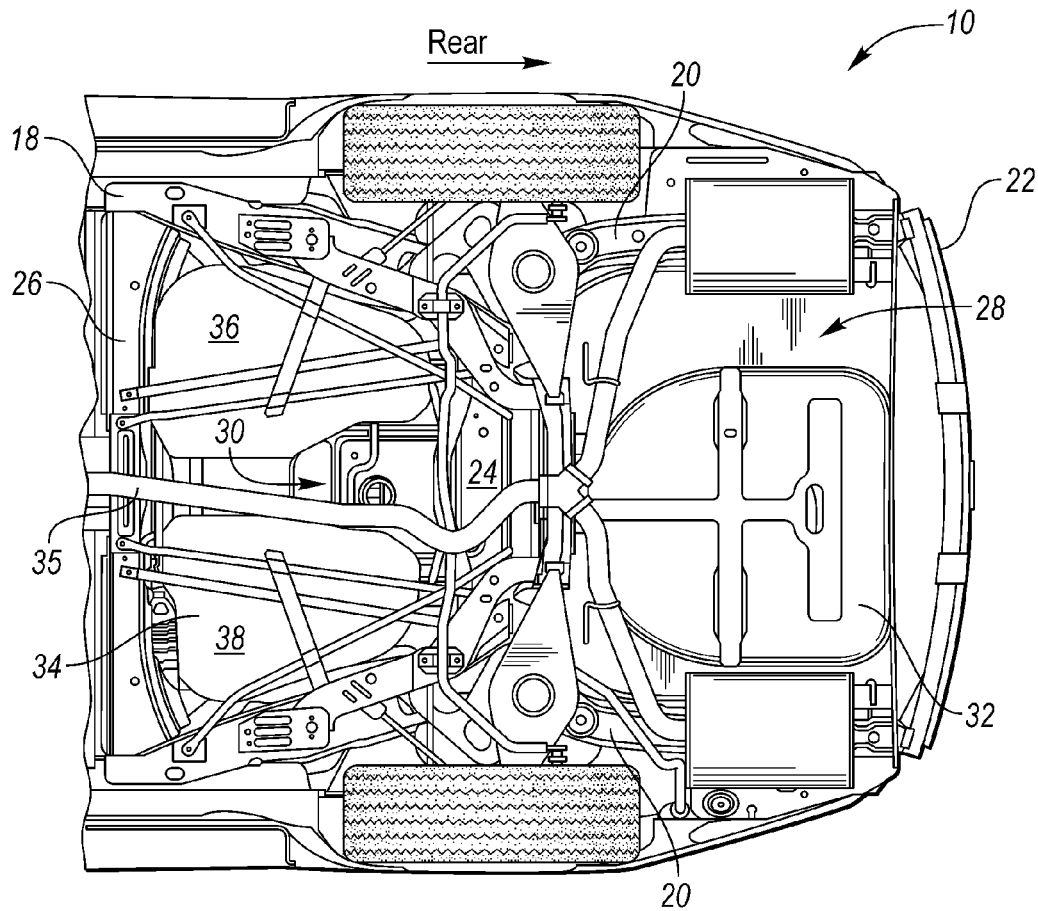
FIG. 2 is a bottom view of the vehicle of FIG. 1.

FIG. 2 is a bottom view of the underside of the rear portion 12 of the vehicle 10. An arrow denoted by "REAR" indicates the rear direction of the vehicle 10. The vehicle body includes an underbody structure 18. The underbody structure 18 comprises two longitudinal rear rails 20 that are laterally spaced from each other to be opposing sides of the vehicle 10. The rear rails 20 are interconnected by a series of laterally extending cross-members. A rear bumper beam 22 extends laterally at a rear most portion of the vehicle 10 beneath the outer rear bumper surface 16. A first lateral cross-member 24 spans across the space between the pair of rear rails 20 at a distance forwardly spaced from the rear bumper beam 22. A second lateral cross-member 26 spans across the space between the pair of rear rails 20 at a distance forwardly spaced from the first lateral cross-member 24. An open portion is defined between each pair of the adjacent lateral members. A first open portion 28 is defined between the rear bumper beam 22 and the first lateral cross-member 24. A second open portion 30 is defined between the first lateral cross-member 24 and the second lateral cross-member 26. Certain vehicle components are recessed downward and packaged within the open portions to optimize package utilization in the vertical direction.

In at least one embodiment, a lower portion of the rear trunk compartment 16 extends down into the first open portion 28 between the rear bumper beam 22 and the first lateral cross-member 24. A recess 32, or "tire tub," may be formed for example to house a vehicle spare tire below the main area of the trunk compartment. In this way, volume of the trunk storage compartment 16 may be maximized in an area above the vehicle spare tire. Other components may similarly extend downwardly into the various open portions between the body sub-frame members to optimize package space.

A fuel tank 34 may be packaged in the second open portion 30 between the first lateral cross-member 24 and the second lateral cross-member 26. Related to packaging of other longitudinal underbody components, the fuel tank 34 may have an amorphous shape to take best advantage of the available space and maximize fuel tank volume. In at least one embodiment, an exhaust pipe 35 extends longitudinally near a center line of the vehicle body. The fuel tank 34 includes two main portions, each straddled on opposing sides of the exhaust pipe 35. A first main portion 36 and a second main portion 38 each include an internal volume and together comprise an overall fuel tank volume.

Components are arranged having a close proximity with respect to each other to increase package efficiency, and available crush space for the vehicle structure to absorb energy during impact may be reduced. Additionally, high performance vehicles may encounter more severe loads as compared to conventional passenger vehicles. For example, law enforcement vehicles may undergo a higher intensity of loading. Also, law enforcement and other emergency response vehicles may commonly carry a large amount of equipment in the trunk storage compartment. Filling the trunk storage compartment with rigid or semi-rigid materials may further reduce the available crush space of the rear vehicle structure. Therefore additional measures may aid in managing rear crash loads through the vehicle structure.

The fuel tank 34 may be formed from plastic or other malleable material to allow for deformation during impact while maintaining the integrity of the internal fuel tank volume. Design limits may be set for example, to limit strain, volume, or other design criteria to enhance performance. Since the geometry of the fuel tank 34 includes the first main portion 36 and the second main portion 38 on opposing sides of the vehicle, it may be advantageous to independently shield each main portion of the fuel tank 34. In at least one embodiment, a cage structure is provided to enclose at least a portion of the fuel tank. In a preferred embodiment, each of a pair of truss structures encloses one of the main portions 36, 38 of the fuel tank 34. Additionally, a truss structure according to the present disclosure may be suitable to enclose a portion of a number of different underbody components as required.

Figure 3:
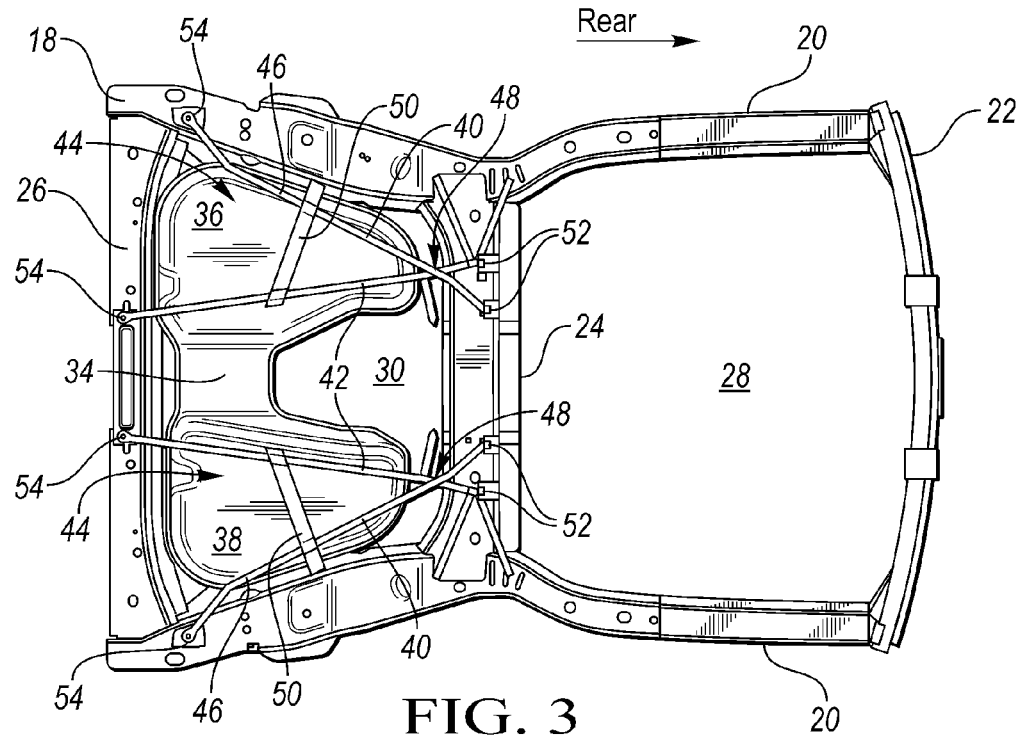
FIG. 3 is a bottom view of a portion of a sub-structure of the vehicle of FIG. 1.
Figure 4:
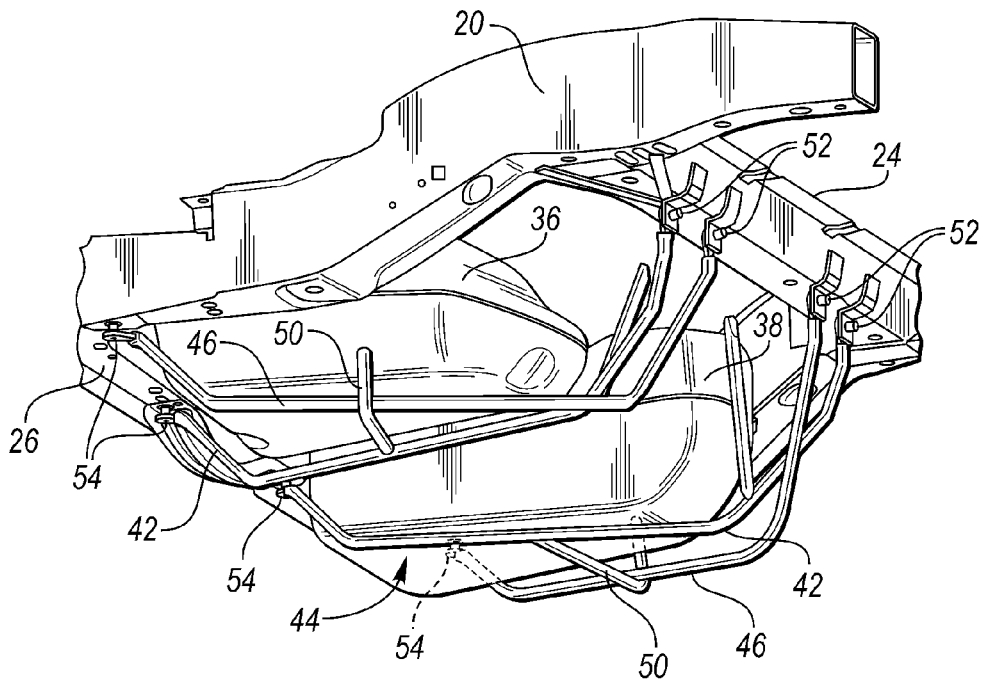
FIG. 4 is a rear perspective view of a portion of a vehicle sub-structure.

Referring to FIGS. 3 and 4, certain components of the vehicle underbody structure are hidden to illustrate certain aspects of a load management structure of the present disclosure. An example truss system 40 is provided on either side of the vehicle 10 to transfer longitudinal loads caused by a rear impact. Each truss system 40 encloses a lower part of one of the main portions 36, 38 of the fuel tank 34. A first elongate member 42 extends at an oblique angle along an outer surface 44 below the fuel tank 34. A second elongate member 46 also extends along the outer surface 44 below the fuel tank at an acute angle relative to the first elongate member 42. The first elongate member 42 and the second elongate member 46 are arranged to form an apex 48 near an end of the members. In one example, the apex 48 is proximate to a rearward end of each of the members and adjacent to the first lateral cross-member 24. Although the apex 48 is depicted near a rear end by way of example, it should be appreciated that the relationship between the first elongate member 42 and the second elongate member 46 may be reversed such that an acute angle between the components defines an apex near a forward end.

Each of the truss systems 40 further include an interconnecting member 50 joining the first elongate member 42 to the second elongate member 46 at locations offset from the apex 48. In at least one embodiment, the interconnecting member 50 is attached to the first elongate member 42 and the second elongate member 46 near a middle portion. The interconnecting member 50 helps to complete a portion of a triangular truss to allow for primarily axial loading of each of the elongate members as compared to bending loads.

The elongate first and second members 42, 46 may be comprised of high strength tubular elements. Similarly, the interconnecting member 50 may comprise a third tubular member. In one example, the members may be formed from high-strength low-alloy (HSLA) steel such as HSLA 350 or HSLA 550. In further examples, ultra high-strength steel such as Usibor® 1500 may allow for additional weight savings through a reduction in material thickness while maintaining the overall stiffness properties of the truss structure.

The tubular members may employ any number of suitable cross section shapes, including various polygonal closed cross sections. Alternatively, open cross sections, such as C-beam cross sections or I-beam cross sections for example, may also provide suitable structure. Generally, an arrangement of elongate members into a truss assembly may efficiently manage rear impact loads associated with a high-performance vehicle.

Referring to FIG. 4, each of the elongate members may be shaped to conform to the lower shape of the fuel tank 34. Related to the depth of the lower position of the fuel tank, the structure of the truss system 40 may include a series of bends to create an upright portion near a front end, a generally horizontal portion near a middle portion, and an upright portion near an opposing rear end of the truss structure 40. By packaging on the underside of the fuel tanks, bulky reinforcements that intrude into the passenger compartment may be avoided.

As discussed above, the truss structures of the present disclosure may be employed to manage severe rear impact loads associated with a high-performance vehicle. Conversely, a standard series variant of the same vehicle may not require the supplemental structure, as it generally experiences less severe loads. In at least one embodiment, the truss system 40 is provided as a structural enhancement bolt-on upgrade to a standard series variant. For example, bolted attachment may be employed at the terminal ends of the elongate members. Rearward bolted attachments 52 may be secured to the first lateral cross-member 24 aft of the fuel tank 34. Similarly, forward bolted attachments 54 may be secured to the second lateral cross-member 26 on the forward side of the fuel tank 34. In this way, a truss structure according to the present disclosure may be selectively equipped on a vehicle without the need for expensive fixtures and tooling.

Figure 5:
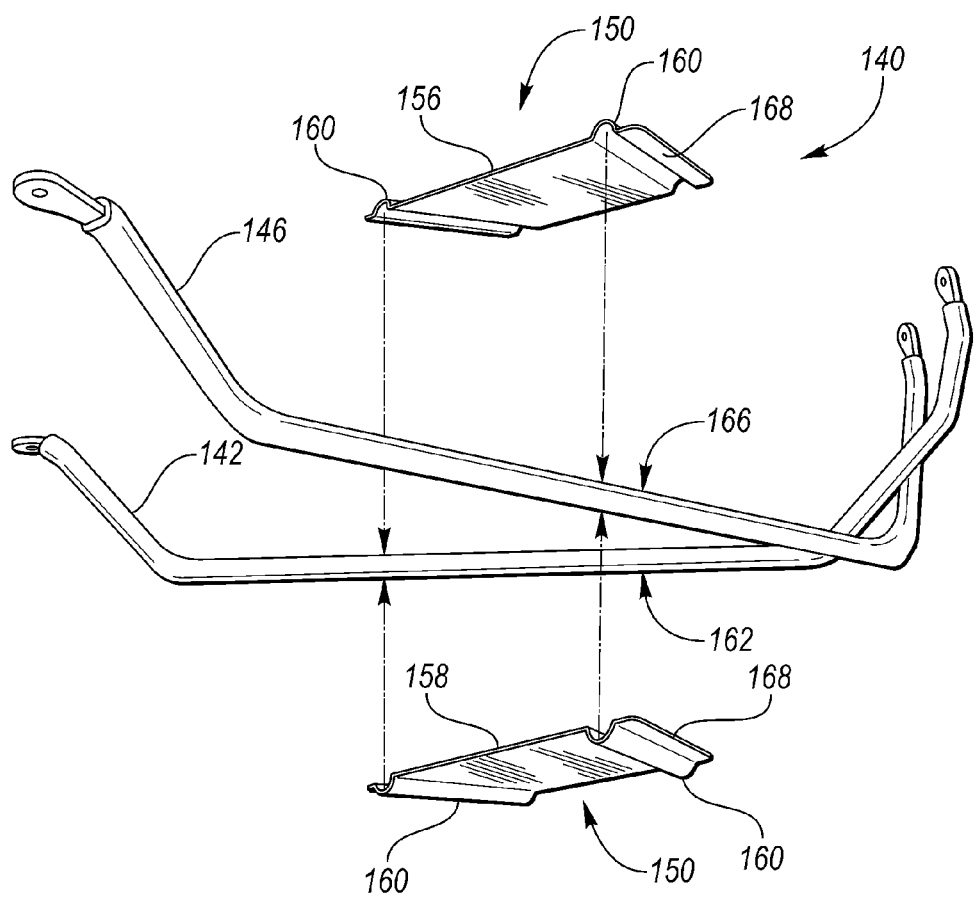
FIG. 5 is an exploded view of a load management truss structure.

FIG. 5 is an exploded view of an alternate embodiment truss system 140. An interconnecting member 150 comprises a pair of opposing plates. An upper plate 156 and a lower plate 158 each define interface portions 160 that are shaped to conform to outer surfaces 162, 166 of the first elongate member 142 and the second elongate member 146, respectively. The upper plate 156 and the lower plate 158 further include mating portions 168 to join to each other such that the corresponding interface portions 160 enclose a portion of each of the first member 142 and the second member 146. In at least one embodiment, the mating portions 168 comprise mating flanges that are arranged to be joined by welding, bonding, riveting, bolts, or other structural joining means. In further alternative embodiments, a single flat plate may be joined to a single side of the first elongate member 142 and the second elongate member 146 without an opposing plate.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle structure comprising:
   a first member extending obliquely beneath an outer surface of an underbody component;

a second member extending at an acute angle to the first member and forming an apex near an end of the first member; and an interconnecting member connected to both the first and second members at locations offset from the apex, wherein the first member, the second member, and the interconnecting member cooperate to enclose a portion of the underbody component.

2. The vehicle structure of claim 1 wherein each of the first member and the second member define terminal ends that are bolted to a rear underbody portion of the vehicle.

3. The vehicle structure of claim 1 wherein the interconnecting member comprises a pair of opposing plates clamped to each other to enclose a portion of each of the first member and the second member.

4. The vehicle structure of claim 1 wherein the first member and the second member are elongate tubular members.

5. The vehicle structure of claim 4 wherein each of the tubular members include a series of bends to conform to an outer surface of the underbody component.

6. The vehicle structure of claim 1 wherein the apex between the first member and the second member is adjacent to a rear end of the first and second members.

7. The vehicle structure of claim 1 wherein the underbody component comprises a fuel tank.

8. A vehicle structure comprising:
a pair of opposing longitudinal rails extending forward from a rear bumper beam;
a first cross-member connectedly spanning across the rails forward of the bumper beam;
a second cross-member connectedly spanning across the rails forward of the first cross-member;
a fuel tank disposed between the rails, and between the first and second cross-members;
an elongate first member connectedly extending from the first cross-member to the second cross-member at an oblique angle;
an elongate second member connectedly extending from the first cross-member at an acute angle relative to the first elongate member and forming an apex proximate to the first cross-member; and
at least one interconnecting member joining the first elongate member to the second elongate member, wherein the elongate first and second members enclose a lower portion of the vehicle fuel tank.

9. The vehicle structure of claim 8 wherein the interconnecting member comprises a pair of opposing plates clamped to each other to enclose a portion of each of the elongate first and second members.

10. The vehicle structure of claim 8 wherein the elongate first and second members are tubular members shaped to conform to an underside surface of the fuel tank.

11. The vehicle structure of claim 8 wherein terminal ends of each of the elongate first member and the elongate second member are bolted to the first cross-member and the second cross-member respectively.

12. A vehicle load management system comprising:
an underbody frame including a pair of longitudinal rails connected by laterally extending cross-members;
a fuel tank disposed between the pair of longitudinal rails and between two adjacent laterally extending cross-members; and
a pair of truss structures connectedly spanning the underbody frame beneath a portion of the fuel tank.

13. The vehicle load management system of claim 12 wherein each of the pair of truss structures is shaped to conform to a lower surface of the fuel tank.

14. The vehicle load management system of claim 12 wherein each of the pair of truss structures includes
a first elongate member connecting two adjacent laterally extending cross-members at an oblique angle,
a second elongate member connecting two adjacent laterally extending cross-members at an acute angle relative to the first elongate member and forming an apex proximate to one cross-member, and
at least one interconnecting member joining the first elongate member to the second elongate member near a middle portion.

15. The vehicle load management system of claim 14 wherein at least one of the first elongate member and the second elongate member are bolted to two adjacent laterally extending cross-members.

16. The vehicle load management system of claim 14 wherein the at least one interconnecting member comprises a pair of opposing plates joined to each other to clamp a portion of the first elongate member and the second elongate member.

* * * * *